United States Patent
Sicuri et al.

(10) Patent No.: US 10,278,359 B2
(45) Date of Patent: May 7, 2019

(54) DOUBLE CHAMBER VOLUMETRIC MILK METER

(71) Applicant: INTERPULS S.P.A., Albinea (IT)

(72) Inventors: Roberto Sicuri, Albinea (IT); Gabriele Nicolini, Albinea (IT)

(73) Assignee: INTERPULS S.P.A., Albinea (RE) (IT)

( * ) Notice: Subject to any disclaimer, the term of this patent is extended or adjusted under 35 U.S.C. 154(b) by 111 days.

(21) Appl. No.: 15/513,388

(22) PCT Filed: Sep. 21, 2015

(86) PCT No.: PCT/IB2015/057253
§ 371 (c)(1),
(2) Date: Mar. 22, 2017

(87) PCT Pub. No.: WO2016/046722
PCT Pub. Date: Mar. 31, 2016

(65) Prior Publication Data
US 2017/0238499 A1      Aug. 24, 2017

(30) Foreign Application Priority Data

Sep. 24, 2014   (IT) .............................. TO2014A0751

(51) Int. Cl.
*A01J 5/00* (2006.01)
*A01J 5/01* (2006.01)
*G01F 15/00* (2006.01)

(52) U.S. Cl.
CPC .............. *A01J 5/01* (2013.01); *G01F 15/005* (2013.01)

(58) Field of Classification Search
CPC .. A01J 5/01; A01J 5/007; A01J 5/0075; A01J 11/00–11/02; G01F 15/005; G01F 15/00;
(Continued)

(56) References Cited

U.S. PATENT DOCUMENTS

| 5,035,139 A | | 7/1991 | Hoefelmayr et al. |
| 5,052,341 A | * | 10/1991 | Woolford ................ A01J 5/041 |
| | | | 119/14.17 |
| 5,094,112 A | | 3/1992 | Hoefelmayr et al. |

FOREIGN PATENT DOCUMENTS

| CA | 2779531 A1 | 5/2011 |
| EP | 0315201 A2 | 5/1989 |

(Continued)

*Primary Examiner* — Joshua J Michener
*Assistant Examiner* — George Andonyan
(74) *Attorney, Agent, or Firm* — Howson & Howson LLP

(57) ABSTRACT

Milk meter (10) for milking plants comprising an upper collecting chamber (30) delimited at the top by a covering membrane (33), a first discharge opening (22) connectable to a milk passage manifold of a milking plant, said first discharge opening (22) being adapted to put in communication the milk passage manifold with the upper collecting chamber (30), a lower measuring chamber (40) connected to the upper collecting chamber (30) and communicating with it by means of a second discharge opening (32), a shutter (31) comprising a central portion (36), adapted to open and/or close the second discharge opening (32), and an upper portion (37) connected to the central portion (36) and associated with the covering membrane (33), wherein the central portion (36) of the shutter (31) comprises a chimney (51) to discharge upwards, that is towards the upper collecting chamber (30) and towards the first discharge opening (22), the air rising from the lower measuring chamber (40) when the latter chamber becomes filled with milk.

9 Claims, 5 Drawing Sheets

(58) Field of Classification Search
CPC ... G01F 15/08; G01F 1/00; G01F 1/52; G01F 11/00; G01F 13/00; G01F 17/04; G01G 17/04; G01G 9/00; G01N 9/00; G01N 9/24; G01N 9/36
USPC ........ 14/14.14, 14.15, 14.17, 14.18; 137/600
See application file for complete search history.

(56) References Cited

FOREIGN PATENT DOCUMENTS

| EP | 2057895 A1 | * | 5/2009 | ............. | A01J 5/041 |
| EP | 2179644 A1 | * | 4/2010 | ............. | A01J 5/041 |
| JP | 2011-103813 A | | 6/2011 | | |

* cited by examiner

DOUBLE CHAMBER VOLUMETRIC MILK METER

TECHNICAL FIELD

The present invention relates to a volumetric milk meter for measuring the amount of milk milked from a cow, for milking plants used in breeding farms, and more particularly it relates to a volumetric milk meter with double chamber.

Preferably, though not exclusively, the invention is installed between the milking unit and the milk duct, and the following description will refer especially to this preferred application.

PRIOR ART

In the field of systems for the automatic measurement of milk production in breeding farms, it is known to use milk meters of the volumetric type.

In breeding farms for milk animals, real-time availability of production data allow to remarkably improve monitoring and management of the herd, as it allows to calculate the lactation curve, or production, for each animal, with the advantage that possible critical conditions regarding health of the animals are promptly detected.

Milk meters are usually installed between the milking unit and the milk duct and they continuously measure milk production in the course of milking, without the need of collecting it in containers as happens with other kinds of meters.

An example of such metering devices is provided by volumetric-type meters, which are based on counting well-defined weight or volume portions and are the most widespread systems for the automatic measurement of milk production. Their working principle is based on counting the cycles of filling and subsequent emptying of a chamber of known volume, in which the milk coming from the milking unit accumulates, and they ensure good measuring precision. The final total number of cycles determines the overall production for a certain milking.

However, the devices of the aforementioned kind exhibit some drawbacks.

One drawback is caused by the presence of foam in the milk present in the milk meter, thus causing problems in the quality of milk and measurement inaccuracies and slowing the milk flow in the device.

Another drawback lies in the fact that these devices are difficult to be cleaned because of the presence of several gaps in the milk meter components, from which milk residues can hardly be removed once measurement has been completed.

A further drawback is caused by the fact that the device has remarkable overall dimensions, which complicate installation, especially in particularly compact plants. For limiting this drawback, some known milk meters do not include any closing valve, necessary for the operation of the system, which is therefore arranged in a dedicated separate component usually located outside the milk meter between the metering device itself and the milking unit. In these cases it is in any case necessary to insert the valve very close to the milk meter, because it is in any case necessary to isolate the milk duct, which is provided downstream of the meter, from the milking unit, which is arranged upstream of the meter, because only in this way the milking unit is no longer under vacuum and can therefore be easily detached from the animal.

A further drawback consists in that, in order to keep reduced the overall dimensions of the device, the milk meter is made with a single collecting chamber, whereby such devices are more approximate, as during emptying thereof, the continuously arriving milk immediately passes into the discharge tube without being metered.

SUMMARY OF THE INVENTION

An object of the present invention is to make a milk meter that maintains optimum quality of the milk passing therethrough.

Another object of the present invention is to make a milk meter that has good measuring precision.

A further object of the present invention is to make an integrated milk meter with small overall dimensions.

These and other objects are achieved by the present invention by providing a milk meter according to the appended claims.

It is to be understood that the appended claims are an integral part of the technical teachings provided herein in the present description in relation to the invention.

BRIEF DESCRIPTION OF THE DRAWINGS

Further features and advantages of the invention will become more apparent from the following detailed description of some preferred embodiments of the invention, given by way of non-limiting example with reference to the annexed drawings, in which.

DESCRIPTION OF A PREFERRED EMBODIMENT

Figure 1:
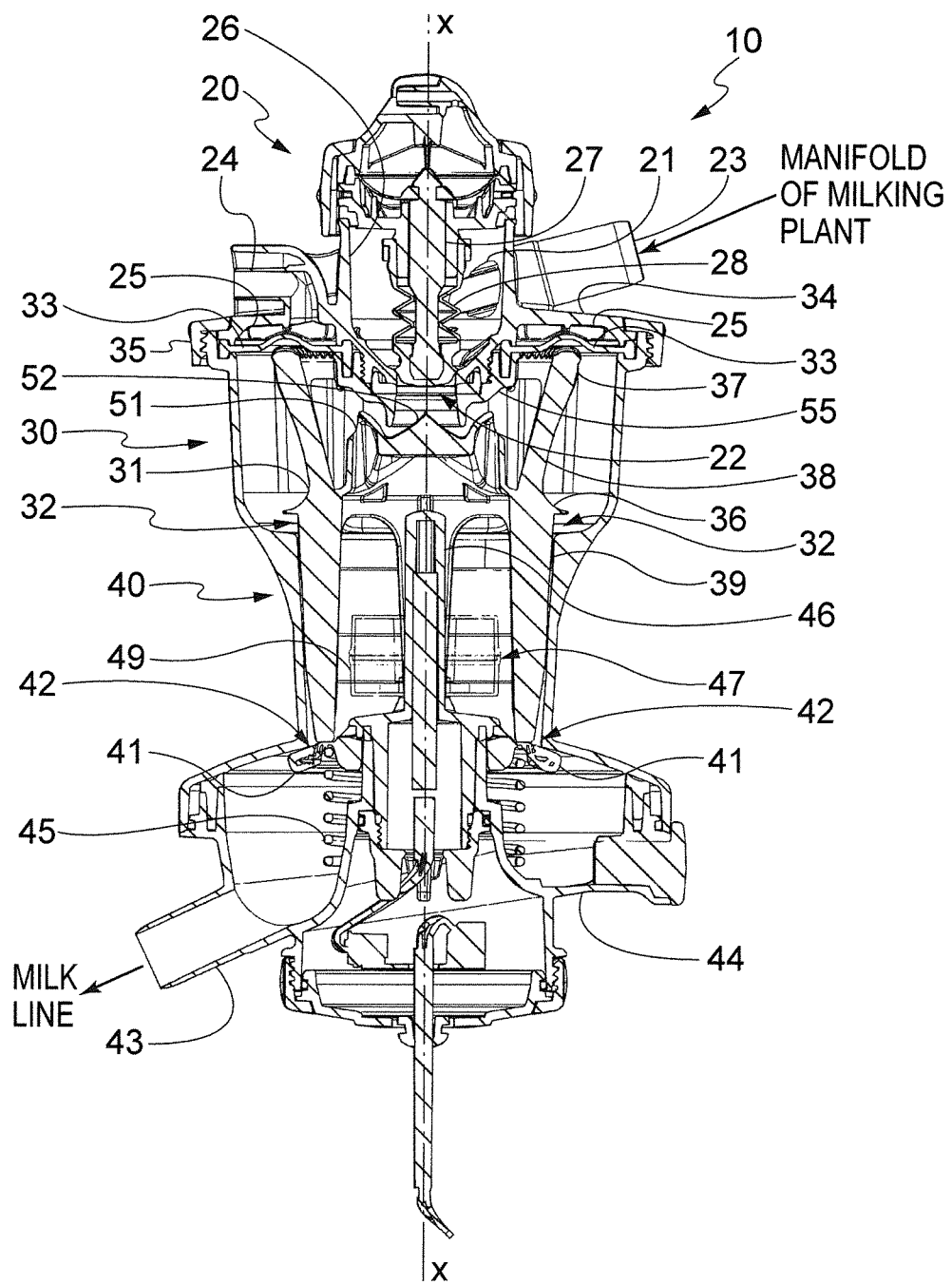
FIG. 1 is a sectional view of a milk meter according to an embodiment of the present invention.
Figure 2:
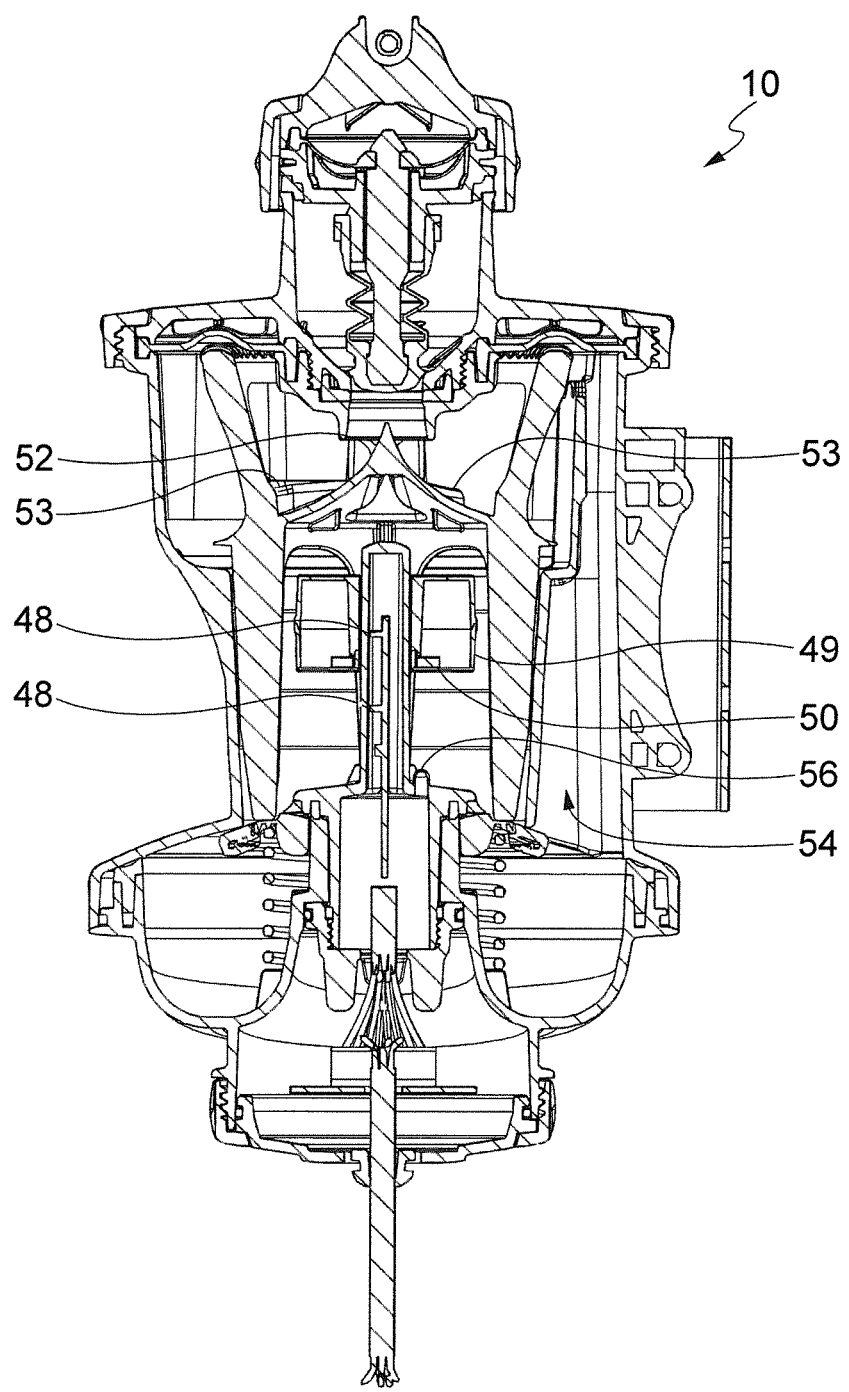
FIG. 2 is a sectional view of a milk meter according to an embodiment of the present invention.
Figure 3:
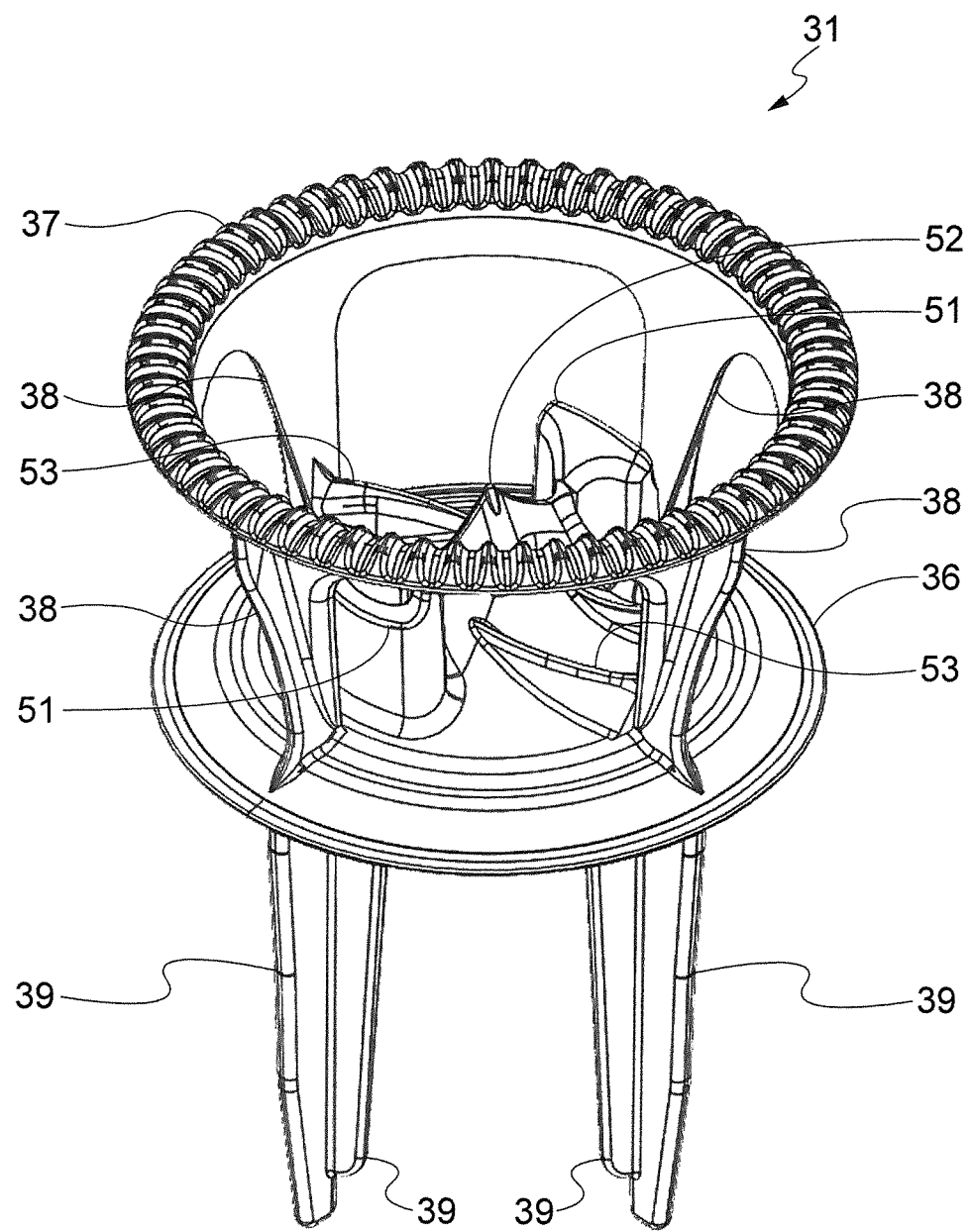
FIG. 3 is a perspective view of a detail of a milk meter according to an embodiment of the present invention.
Figure 4:
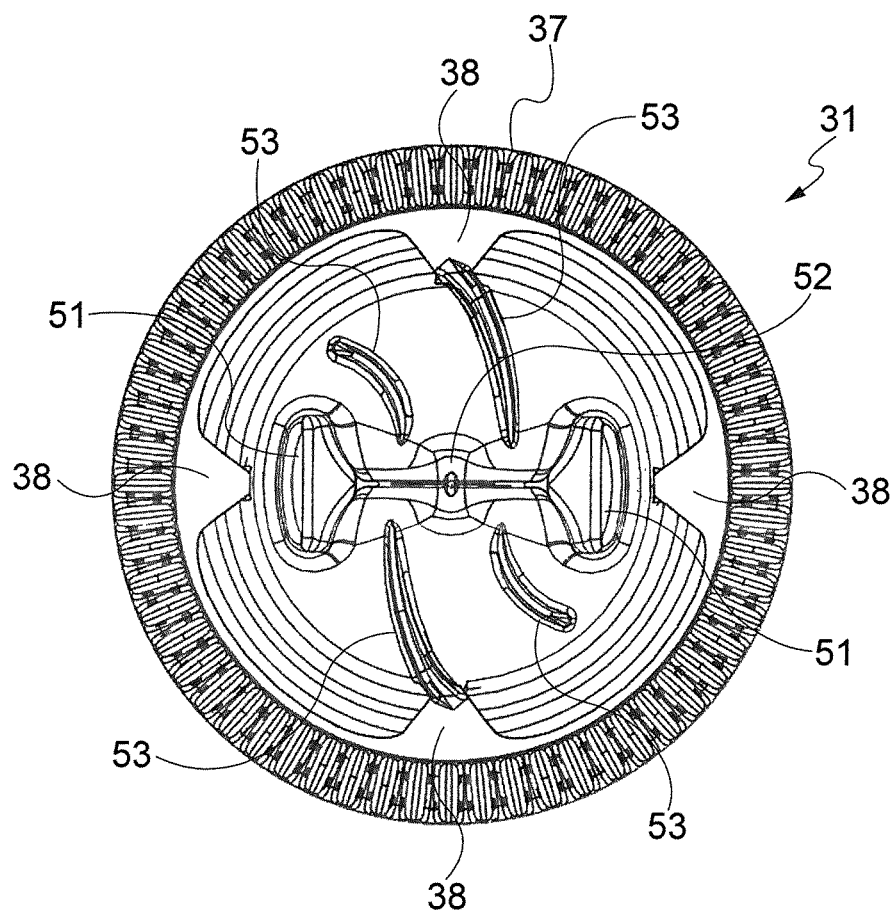
FIG. 4 is a top plan view of the shutter of FIG. 3.
Figure 5:
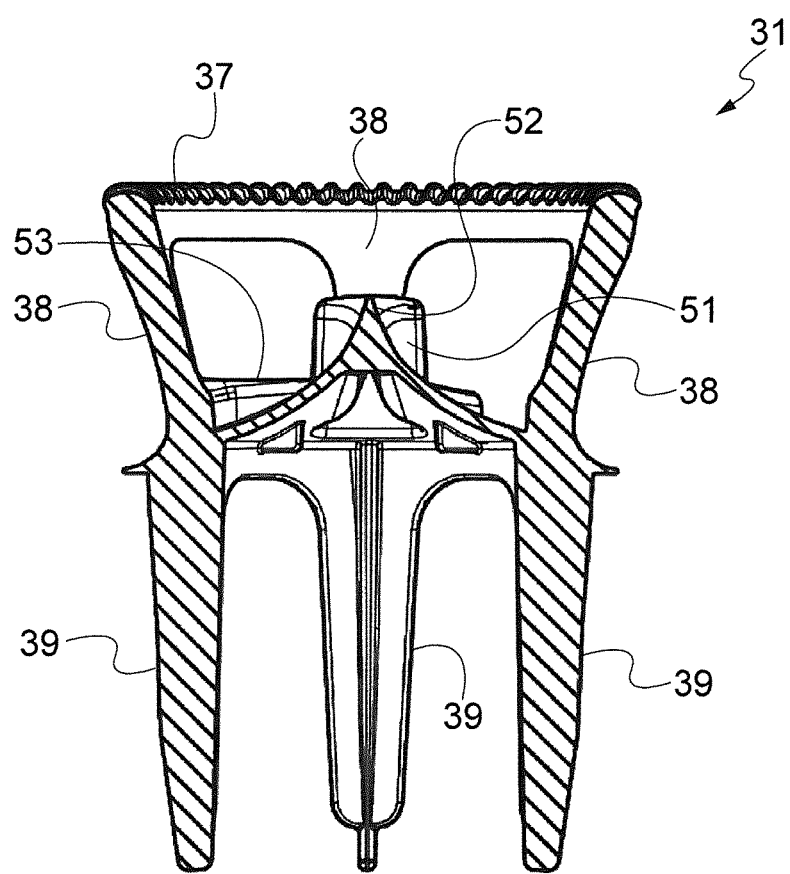
FIG. 5 is a cross-sectional view of the shutter of FIG. 3.

Referring to the Figures, there is illustrated an exemplary embodiment of a milk meter 10 for measuring the amount of milk milked from a cow, for use in milking plants of breeding farms, according to an embodiment of the present invention.

The milk meter 10, also called meter in the present description, preferably comprises a closing valve 20, with an inlet opening 21 connectable, for instance through a nipple 23, to a manifold of a milking plant, an upper collecting chamber 30 connected to the closing valve 20, and a lower measuring chamber 40 connected to the upper collecting chamber 30.

Preferably, the inlet opening 21 is connected to an inlet tube arranged tangentially to the inner wall 26 of the closing valve 20, so that the milk or cleaning liquid of the milk meter 10 enters tangentially to the wall of the valve 20. More preferably, the wall of the closing valve 20 is cylindrical and its axis X-X is coincident with the longitudinal axis X-X of the closing valve 20.

A first discharge opening 22 provided in a top cover 34 or in a ferrule 55 screwed to the top cover 34 preferably puts into communication the closing valve 20 with the upper collecting chamber 30 and allows passage of the milk when the closing valve 20 is open. Preferably, the first discharge opening 22 is located on the central axis of the milk meter 10, with its axis coincident with the longitudinal axis X-X of the closing valve 20.

In an alternative embodiment of the milk meter 10 of the invention, the closing valve is provided outside the milk meter 10 and is inserted close to the milk meter 10 on the manifold of the milking plant, and the upper collecting chamber 30 is connectable to the manifold by means of known connecting means. In this alternative embodiment, the first discharge opening 22 puts into communication the manifold with the upper collecting chamber 30 and allows passage of the milk when the closing valve is open.

The upper collecting chamber 30 is in communication with the lower collecting chamber 40 through a second discharge opening 32 which can be opened and closed by means of a shutter 31.

The upper collecting chamber 30 is delimited at the top by a covering membrane 33, which is connected to the wall of the upper collecting chamber 30 and to the top cover 34, preferably it is retained between the wall of the upper collecting chamber 30 and the top cover 34; preferably the top cover 34 of the milk meter 10 is locked by means of a main ferrule 35 which is screwed on a thread provided at the upper end of the wall of the upper collecting chamber 30.

In a preferred way, the side wall of the closing valve 20 is integrated in the top cover 34.

The milk meter 10 further comprises a membrane chamber 25, said chamber being delimited at the top by the top cover and below by the covering membrane 33; the membrane chamber 25 is connectable, through a channel 24, to a solenoid valve adapted to make atmospheric air flow into said membrane chamber 25 or to create vacuum therein by connecting the membrane chamber 25 to the vacuum line of the known milking plant, so as to cause movement of the covering membrane 33, as will be described in more detail here below.

In a known manner, the milking plant comprises a vacuum pump, which is an element essential for effecting milking and therefore extracting milk from the animal. In the plant there are provided two lines inside which vacuum is created: the first line is the milk duct, i.e. the duct through which the milk passes, and the second line is the vacuum line on which solenoid valves are mounted together with pulsators, which are vacuum-driven components applying vacuum to other components, for instance in the milk duct.

The lower measuring chamber 40 is put into communication with the milk duct through a third discharge opening 42; a bottom shutter 41 is adapted to open and close the third discharge opening 42.

Preferably, the lower measuring chamber 40 is put into communication, through the third discharge opening 42, with a lower body 44, which in turn is connected to the milk duct through the discharge tube 43; in this case, too, the bottom shutter 41 is adapted to open and close the third discharge opening 42; an elastic element 45, for instance a torsion spring, keeps the bottom shutter 41 in its closing position, in contact with the walls of the lower measuring chamber 40, so as to maintain closed the second discharge opening 42.

The parts of the milk meter 10 that are put in communication with the milk duct or with the vacuum line and can therefore be under vacuum, such as the closing valve 20, the membrane chamber 25, the upper collecting chamber 30, the lower measuring chamber 40 and the lower body 44 are tight-sealed.

The shutter 31 comprises a central portion 36, preferably having a disk-like shape, adapted to open and close the second discharge opening 32 putting into communication the upper collecting chamber 30 with the lower measuring chamber 40; the shutter 31 further comprises an upper portion 37 or crown, preferably connected to the central portion 36 by means of connecting means 38, for instance a plurality of small posts. The upper portion 37 of the shutter 31 is associated to the covering membrane 33, preferably it is mounted directly in abutment against the covering membrane 33.

Preferably, the central portion 36 of the shutter 31 comprises a vertical discharge duct or chimney 51, provided on its upper surface facing the upper collecting chamber 30. In a more preferred manner, the central portion 36 of the shutter 31 comprises a pair of vertical discharge ducts or chimneys 51, which have the function of discharging upwards, that is towards the upper collecting chamber 30 and the first discharge opening 22, the air rising from below, that is from the lower measuring chamber 40, which air is present therein whenever said chamber becomes gradually filled with milk, without mixing it with the milk which enters the lower measuring chamber 40 through the second discharge opening 32 and flows, instead, from top to bottom. In this embodiment of the milk meter 10 of the invention, the shutter 31 further comprises, still provided on the upper surface of the central portion 36 facing the upper collecting chamber 30, a connecting wall 52, having for instance the form of a cusp, and preferably a plurality of curved fins 53 having helical bends and preferably developing vertically and symmetrically on the two upper parts of the surface of the central portion 36 of the shutter 31 that are bounded by the connecting wall 52. This connecting wall 52 diametrically joins the two air discharge ducts 51, and forms to all effects a cusp because of its small thickness with which it ends at its top or upper edge.

Advantageously, the chimney 51 has a curved shape at its top, with an opening facing the wall of the upper collecting chamber 30 so that the milk cannot pass from the upper collecting chamber 30 to the lower measuring chamber 40 through the opening of the chimney 51.

Preferably, the fins 53 have a height higher than 2 mm and the two vertical discharge ducts or chimneys 51 have a height which is higher than or equal to half the height of the upper collecting chamber 30; preferably, the height of the connecting wall 52 is substantially equal to the height of the chimneys 51.

Both the cusp-like connecting wall 52 and the fins 53 have the function of suitably guiding the milk 53 passing through the upper collecting chamber 30 by imparting a rotational motion to the mass of milk inside the upper collecting chamber 30. This rotational motion imparted to the mass of liquid generates a centrifugal force such that it breaks the foam bubbles inevitably carried along in the milk as well as those forming in the chamber itself, so as to promote discharge of the milk into the underlying measuring chamber. This last-mentioned factor is very important because it is known that the presence of foam hinders the milk flow, at the expense of the measuring precision of the system.

In the milk meter 10, the covering membrane 33 is mounted directly in abutment against the upper portion 37 of the shutter 31 so as to cause, when it is inflected, displacement of the shutter against which it abuts, as will be described in detail below.

The shutter 31 comprises at least one support 39 connected to its central portion 36, preferably at the lower end of the central portion 36; the shutter 31 preferably comprises a plurality of supports 39.

In the milk meter 10, the shutter 31 is mounted with the support 39 arranged on the bottom shutter 41 which is adapted to open and close the third discharge opening 42 of the lower measuring chamber 40.

The closing valve 20 preferably comprises a closing shaft 27 fixed to an accordion-like membrane 28 adapted to open and/or close the first discharge opening 22 from which the milk flows into the upper collecting chamber 30 by means of the movement of the closing shaft 27; the movement of the closing shaft 27 and of the accordion-like membrane 28 is actuated pneumatically by the same vacuum existing in the vacuum line and by the atmospheric air through the second channel of the solenoid valve connected to the vacuum line described above, which consists of two channels.

Preferably, the covering membrane 33 has an annular or toroidal shape, with a hole in its center on the longitudinal axis X-X of the milk meter 10, so as to leave room for the passage of the first discharge opening 22 for transit of the milk from the manifold to the upper collecting chamber 30.

In the preferred embodiment of the milk meter 10 of the invention, in which the closing valve 20 is arranged centrally, its axis being substantially coincident with the longitudinal axis X-X of the milk meter 10 itself as well as with the axis of the upper collecting chamber 30, the covering membrane 33 has an annular or toroidal shape, with a hole in its center, in the area where the closing valve 20 is arranged, so as to leave room for the first discharge opening 22 for passage of the milk or fluid from the closing valve 20 to the upper collecting chamber 30. In this embodiment of the invention, shown in the figures, the toroidal covering membrane 33 is retained along its outer circumference between the wall of the upper collecting chamber 30 and the top cover 34, and along its inner circumference, the edge of which is preferably received in an annular recess of the top cover 34 and is locked therein by means of a central ferrule 55 arranged at the discharge opening 22.

Preferably, in this embodiment the upper portion 37 or crown of the shutter 31 is a ring-shaped annular crown.

The lower measuring chamber 40 comprises first detection and signaling elements 47 and second detection and signaling elements 48, said first and second elements being mutually cooperating for signaling the level reached by the milk at predetermined volumes of milk collected in the lower measuring chamber 40; as the milk fills the lower measuring chamber 40, the float rises together with the magnet contained therein. When the float reaches the first detection element, there are for instance about 100 grams of milk in the chamber, while there are for instance about 190 grams when the float comes close to the second and last detection element. Here the system actuates the solenoid valve described above, which controls closing of the discharge opening 32 and opening of the discharge opening 42 by displacing downwards the shutter 31. Total emptying of the chamber 40 is practically instantaneous and subsequently the filling step is repeated. Advantageously, the first detection elements 47 are adapted to measure the amount of milk present in the milk meter 10 at a lower volume of milk contained in the lower measuring chamber 40, allowing to reduce the error committed upon measuring in case of partial filling of the lower measuring chamber 40.

Preferably, the first detection and signaling elements consist of a float 49, for instance having a toroidal cylindrical shape and being hollow inside, and an annular magnet 50 having adequate power and size, for instance with a thickness for instance of about 3.5 mm, an outer diameter of 28 mm and an inner diameter of 17 mm, contained in the float 49 and adapted to cooperate with the second detection and signaling elements 48.

In a preferred way, the lower measuring chamber 40 comprises a guide element 46 for the float 49, said guide element consisting for instance of a shaft 46 extending vertically at the center of the measuring chamber itself in the direction of its axis X-X. For example, the second detection and signaling elements 48 are mounted in the shaft 46 and are adapted to signal the position of the float 49 at two specific different levels corresponding to two predetermined volumes of milk collected in the lower measuring chamber 40.

Preferably, the second detection and signaling elements are a pair of Hall contacts of known type that are mounted on an electronic board contained in the shaft 46 and the annular magnet 50 cooperates with both Hall contacts whenever it passes adjacent to them during the rising of the float 49 upwards, which rising is generated by the thrust of the milk accumulating in the lower measuring chamber 40.

The milk meter 10 of the invention further comprises a vacuum stabilization channel 54, which is a large vertical channel extending vertically for the entire length of the milk meter 10, putting into communication the chamber of the lower body 44 with the upper part of the upper collecting chamber 30 adjacent to the covering membrane 33. This channel allows to keep a constant value of the vacuum level inside the milk meter 10 during operation thereof.

Preferably, metal terminals 56 being part of a conductivity and temperature probe are arranged close to the base of the guide shaft of the toroidal float mentioned above.

The operation of the milk meter 10 of the invention is as follows.

In a first optional step, which is present in the case of the milk meter comprising the closing valve 20, the milk coming from the milking manifold located upstream of the milk meter or meter 10 enters the room inside the closing valve 20 tangentially to the inner wall 26 thereof though the inlet opening 21, preferably though the nipple 23; this tangential inlet into the closing valve 20 imparts a centrifugal force to the milk so that the milk becomes distributed over the entire inner wall 26 of the room forming the valve itself, which space preferably has a cylindrical shape, so as to convey the milk to the first discharge opening 22.

Advantageously, the tangential entry of the milk imparts a centrifugal force to the milk in transit such that foam bubbles that may be present in the fluid vein are broken, thus solving the problem that would arise with a central entry, where the incoming milk jet would hit the accordion-like membrane 28, thus forming a relevant amount of foam.

In milking conditions, the closing shaft 27 of the closing valve 20 is in the raised "open" position and is therefore lifted upwards; during detachment of the milking unit from the animal, instead, the closing shaft 27 sinks until its free end, and especially the accordion-like membrane 28, closes the underlying first discharge opening 22.

In a second step, the milk continues its path descending into the underlying upper collecting chamber 30 of the meter. The upper portion 37 of the shutter 31 is received in this chamber; the shutter 31 is a component performing several tasks, the main one of which is that of closing the upper collecting chamber 30 when discharge of milk from the lower measuring chamber 40 starts, and then opening it again when the bottom shutter 41 closes again the underlying lower measuring chamber 40, immediately after discharging the milk contained therein. The milk, as soon as it exits the first discharge opening 22 of the closing valve 20 and enters the upper collecting chamber 30, immediately intercepts the upper portion 37 of the underlying shutter 31; in the embodiment of the invention comprising the discharge ducts 51 for the air coming from the lower measuring chamber 40, the cusp-like connecting wall 52 transversely joining the discharge ducts 51 divides in two the incoming milk flow directly impacting on it, so as to prevent that, even for high flow rates, part of the milk descends through the discharge ducts 51. If this should happen during the step of discharging from the lower measuring chamber 40, this part of the milk would pass through the whole milk meter 10 without being metered, thus causing a measuring error. In the embodiment of the milk meter 10 of the invention in which the helicoidally developing protruding fins 53 are located in the two upper portions of the shutter 31 delimited by the cusp-like connecting wall 52, said fins impart a rotational motion, for instance anti-clockwise, to the milk in transit which has just been deflected by the cusp-like connecting wall 52, before descending into the underlying lower measuring chamber 40. It is desired to impart such motion to the liquid in transit for the following reasons:

The milk coming from the milking unit inevitably generates foam during its transit, or even entrains said foam with it after the foam has formed inside the manifold arranged upstream of the meter. Such foam portion can be a remarkable amount and it may even hinder regular flow of the milk into the underlying measuring chamber 40. By imparting a rotational motion to the mass of milk, the imparted centrifugal force exerts a mechanical action such that the foam bubbles that have formed are broken and even formation thereof in the upper collecting chamber 30 is controlled, with the advantage of a quick discharge corresponding to a performance product.

During the washing step at the end of milking it is very important to manage to impart a centrifugal rotational motion to the washing solution in transit, as this moving solution reaches its best cleaning efficiency because of the rubbing mechanical action it exerts onto the surfaces with which it comes into contact.

In a third step, the incoming milk therefore passes through the upper collecting chamber 30 and then descends into the lower measuring chamber 40 in which there are provided the first detection and signaling elements 47 and the second detection and signaling elements 48, for instance the float 49, the annular magnet 50 and the Hall contacts mounted on the electronic board contained in the shaft 46.

In a fourth step, when the milk arrives at the predetermined upper level in the measuring chamber 40, the detection and signaling elements 47, 48 command a channel of the solenoid valve connected to the milk meter 10 to let atmospheric air inflow, through the channel 24, into the membrane chamber 25, above the covering membrane 33 which is in turn arranged above the upper collecting chamber 30. In the embodiment of the milk meter 10 of the invention in which the detection and signaling elements 47, 48 are the float 49, with the annular magnet 50 at its inside, and the Hall contacts, the milk collecting in the measuring chamber lifts the float 49, whose magnet 50 contained at its inside cooperates with the Hall contacts; when the float 49 and the magnet 50 arrive at the contact located at the upper point, the contact commands a channel of the solenoid valve connected to the meter to let atmospheric air inflow, through the channel 24, into the membrane chamber 25, above the covering membrane 33.

Due to the fact that the covering membrane 33 forms an integral part of the upper collecting chamber 30, as it superiorly delimits said chamber, the membrane is touched, in its lower portion, by the vacuum which is always present in said chamber. The covering membrane 33 in rest conditions is in any case in abutment, and therefore in direct contact, against the upper portion 37 or crown of the shutter 31; under the action of the vacuum present inside the upper collecting chamber 30 delimited by said membrane, the covering membrane 33 inflects downwards, thus causing displacement of the underlying shutter 31 against which it abuts. Vacuum is present inside the whole milk meter 10, as this is connected to the milk duct, which is the vacuum source both for the milk meter 10 and the manifold. This displacement downwards of the shutter 31 in turn causes closing of the upper collecting chamber 30 and simultaneous opening of the lower measuring chamber 40, because the support(s) 39 push(es) downwards the bottom shutter 41, overcoming the force of the spring 45 and thus opening the third discharge opening 42, through which the milk flows out of the lower measuring chamber 40.

In a fifth step, the milk continuously arriving from the milking manifold collects in the upper collecting chamber 30 which has been closed in the preceding fourth step, whereas the milk which has filled the underlying lower measuring chamber 40 is discharged very quickly, preferably into the lower body, until it reaches the milk duct connected thereto by means of the discharge tube 43. Emptying of the lower measuring chamber 40 makes the detection and signaling elements 47, 48 detect the complete absence of milk inside the lower measuring chamber 40, causing inversion of the cycle, whereby the third discharge opening 42 is closed and the second discharge opening 32 is open, for causing a subsequent filling. In the embodiment of the milk meter 10 of the invention in which there are provided the float 49, the annular magnet 50 and the Hall contacts, emptying of the lower measuring chamber 40 brings the float 49 back to its lower position and thus the condition of milk collection in the lower measuring chamber 40 is restored.

In a sixth step, the condition of milk collection in the lower measuring chamber 40 which has just been emptied is restored in the following way:
a) vacuum is restored in the membrane chamber 25 above the covering membrane 33 by means of an outer solenoid valve and thus the downward thrust exerted by the covering membrane 33 in its former condition is annulled;
b) the spring 45 arranged below the bottom shutter 41 and inferiorly delimiting the lower measuring chamber 40 extends upwards in the absence of the opposite thrust of the membrane, and its thrust causes closing of the third discharge opening 42 of the lower measuring chamber 40. The upward displacement of the bottom shutter 41 in turn causes displacement of the shutter 31, arranged thereon, in the same direction, with the result that the second discharge opening 32 between the shutter 31 and the upper collecting chamber 30 is opened. The opening of this discharge opening allows outflow of the milk, coming from the milking manifold and collected in the upper collecting chamber 30 during the step of emptying the lower measuring chamber 40, into the underlying lower measuring chamber 40, where the measuring cycle described above is repeated.

As already described, the milk meter 10 of the invention comprised the vacuum stabilization channel 54, which is a large vertical channel is a large vertical channel extending vertically for the entire length of the milk meter 10.

The vacuum stabilization channel 54, putting into communication the lower body 44 with the upper portion of the upper collecting chamber 30 adjacent to the covering membrane 33, allows to keep a constant value of the vacuum level inside the milk meter 10 during operation thereof, irrespectively of the amount of milk passing through it; this is a condition that ensures self-support of the milking unit, because the sheaths provided thereon are self-supported by means of vacuum around the teats of the animal.

As mentioned above, metal terminals being part of a conductivity and temperature probe are arranged close to the base of the guide shaft of the toroidal float. Conductivity is an important parameter identifying the presence or absence of an inflammatory state of the animal, and therefore the presence or absence of conditions for possible development of mastitides and/or infections. The temperature probe, in turn, can detect a feverish state of the animals, besides indicating the temperature of the washing solution, which is an essential parameter for establishing whether such washing solution is effective or not effective during the washing operation. A suitable connector is therefore arranged in the lower portion of the milk meter 10 for inserting an adequate container inclusive of coupling. This component is inserted before milking of an animal starts and is removed at the end of milking whenever taking of milk is desired for analyzing the same; such action has the purpose of taking a certain milk sample representative of the entire milking, because milk composition varies continuously while milking proceeds (the fat percentage contained therein varies), in order to carry out control analyses thereof. Under normal milking conditions without sample taking, the nipple is suitably closed by an appropriate cap, in order to prevent atmospheric air from entering the milk meter.

Advantageously, the milk meter 10 according to the present invention allows to make an integrated milk meter with reduced overall dimensions. Indeed, the provision of the shutter performing the double function of opening and closing the second discharge opening 32 and controlling the opening and closing of the third discharge opening 42 allows to make a milk meter with reduced overall dimensions. In addition, the milk meter 10 of the invention has the advantage that it maintains optimal quality of the milk passing through it and good measuring precision. Indeed, thanks to its configuration, it allows effective discharge of the foam-free milk, thus preventing bacteria contained in the surrounding air and forming foam bubbles from contaminating the milk with the airborne bacterial loads.

The configuration of the milk meter, particularly of the shutter surface, with the chimneys and fins, allows to displace milk without damaging it, thus maintaining high quality thereof.

Furthermore, the absence of foam in the measuring chamber allows good measuring precision.

Of course the embodiments and manufacturing details may be widely varied with respect to what has been described and illustrated merely by way of non-limiting example, without departing from the scope of the present invention as defined in the appended claims.

The invention claimed is:

1. A milk meter comprising:
an upper collecting chamber delimited at a top by a covering membrane;
a first discharge opening connectable to a milk passage manifold of a milking plant, said first discharge opening being adapted to put in communication the milk passage manifold with the upper collecting chamber;
a lower measuring chamber connected to the upper collecting chamber and communicating with the upper collecting chamber by means of a second discharge opening;
a shutter comprising a central portion, adapted to open and close the second discharge opening, and an upper portion connected to the central portion and associated to the covering membrane;
wherein the central portion of the shutter comprises two discharge ducts to discharge upwards, that is towards the upper collecting chamber and towards the first discharge opening, air rising from the lower measuring chamber when the lower measuring chamber becomes filled with milk,
wherein the milk meter further comprises a plurality of curved fins having helical bends and developing on a surface of the central portion of the shutter for imparting a rotational motion to a mass of milk inside the upper collecting chamber, and
wherein the central portion of the shutter comprises a connecting wall that diametrically joins the two discharge ducts for discharging the air.

2. The milk meter according to claim 1, wherein the covering membrane has an annular shape or a toroidal shape, with a hole at a center of the covering membrane on a longitudinal axis of the milk meter for passage of the first discharge opening.

3. The milk meter according to claim 1, wherein the connecting wall has a form of a cusp, and the plurality of curved fins having helical bends develop vertically and symmetrically on two parts of the surface of the central portion of the shutter bounded by the connecting wall.

4. The milk meter according to claim 1, wherein the milk meter comprises a membrane chamber delimited at a top by a top cover and below by the covering membrane, and wherein the covering membrane is connected to a wall of the upper collecting chamber and to the top cover in which the first discharge opening is provided.

5. The milk meter according to claim 1, wherein the milk meter comprises a closing valve having an inlet opening connectable to the milk passage manifold of the milking plant, said closing valve being connected to the upper collecting chamber by means of the first discharge opening that is adapted to put into communication the closing valve with the upper collecting chamber.

6. The milk meter according to claim 1, wherein the milk meter comprises a bottom shutter adapted to open and close a third discharge opening for putting into communication the lower measuring chamber with a milk line of the milking plant.

7. The milk meter according to claim 6, wherein the shutter comprises a support connected to the central portion of the shutter and mounted in abutment against the bottom shutter.

8. The milk meter according to claim 7, wherein the milk meter comprises a lower body communicating with the lower measuring chamber by means of the third discharge opening and connected to the milk line of the milking plant through a discharge tube.

9. The milk meter according to claim 6, wherein the milk meter comprises a lower body communicating with the lower measuring chamber by means of the third discharge opening and connected to the milk line of the milking plant through a discharge tube.

* * * * *